United States Patent [19]

Tsunoda et al.

[11] 4,406,578

[45] Sep. 27, 1983

[54] METHOD FOR OPERATING PUMPS

[75] Inventors: Sachio Tsunoda; Katsunori Shirasu, both of Yokohama, Japan

[73] Assignee: Tokyo Shibaura Denki Kabushiki Kaisha, Kawasaki, Japan

[21] Appl. No.: 221,332

[22] Filed: Dec. 29, 1980

[30] Foreign Application Priority Data

Dec. 28, 1979 [JP]  Japan .................................. 54-173291

[51] Int. Cl.³ .............................................. F03B 3/10
[52] U.S. Cl. ........................................ 415/1; 290/52; 415/61; 415/62
[58] Field of Search ................... 415/1, 61, 62, 145; 290/52; 60/398; 137/566

[56] References Cited
U.S. PATENT DOCUMENTS 2,246,472  6/1941  Sharp ................................ 415/108

FOREIGN PATENT DOCUMENTS 416502  1/1967  Switzerland .

*Primary Examiner*—Harvey C. Hornsby
*Assistant Examiner*—Arthur D. Dahlberg
*Attorney, Agent, or Firm*—Oblon, Fisher, Spivak, McClelland & Maier

[57] ABSTRACT

A method for operating pumps in a pumping-up power plant having a single speed reversible pump turbine and a booster pump, the booster pump being provided in a branch pipe which is provided in parallel with a portion of a draft tunnel between the pump turbine and a lower reservoir, is disclosed. The method includes the steps of initiating the closing of a first inlet valve at the discharge side of the pump turbine, disconnecting the pump turbine and the booster pump simultaneously from an outer electric power system to which the pump turbine and the booster pump are connected, after an opening of the first inlet valve is closed to a predetermined value, and then closing the first inlet valve completely.

5 Claims, 3 Drawing Figures

METHOD FOR OPERATING PUMPS

BACKGROUND OF THE INVENTION

1. Field of the Invention

This invention relates to a method for operating pumps, and more particularly to a method for stopping pumps in a pumping-up power plant having a single speed reversible pump turbine and a booster pump.

2. Description of the Prior Art

Generally, a single speed reversible pump turbine has such characteristics that the maximum efficiency point in the turbine operation mode is different from that in pump operation mode.

Namely, the turbine net head where the efficiency in turbine operation is maximum is larger than the pump total head where the efficiency in pump operation is maximum. But in a practical pumping-up power plant, the turbine net head in turbine operation is smaller than the pump total head in pump operation by the head loss of the water way between an upper reservoir and a lower reservoir. Therefore, when a pump turbine is operated as a turbine at a high efficiency speed or point, where the efficiency in pump operation is low, then it must be operated as a pump at a low efficiency point. Recently a new pumping-up power plant has been proposed where there is provided a booster pump in series with a single speed reversible pump turbine in order to prevent low efficiency in pump operation of the pump turbine. Namely, the booster pump is operated to provide a certain part of the necessary head for a high efficiency operation in the pumping-up power station in addition to the head generation by the pump turbine. As pumping-up power plants are confronted by a keen demand for high efficiency operation of the pump turbine from an economical standpoint, the demand for a method of operating a single speed reversible pump turbine together with a booster pump is very promising. But many technical problems arise in the operation of a single speed reversible pump turbine together with a booster pump, and an accurate control technique is necessary, especially in pump operation, for control in pump operation is very complicated.

SUMMARY OF THE INVENTION

Accordingly, one object of this invention is to provide a novel method for operating pumps in a pumping-up power plant having a single speed reversible pump turbine and a booster pump, in which the pump turbine as a pump and the booster pump operating in series with each other can be stopped simply and without a complicated control technique.

Another object of this invention is to provide a method for operating pumps in a pumping-up power plant having a single speed reversible pump turbine and a booster pump, in which the pump turbine as a pump and the booster pump, operating in series with each other, can be stopped smoothly and promptly, without a complicated control technique.

These and other objects of this invention can be achieved by providing a method for operating pumps in a pumping-up power plant having a single speed reversible pump turbine and a booster pump, the booster pump being provided in a branch pipe which is provided in parallel with a portion of a draft tunnel between the pump turbine and a lower reservoir.

The method includes the steps of initiating the closing of a first inlet valve at the discharge side of the pump turbine, disconnecting the pump turbine and the booster pump simultaneously from an outer electric power system to which the pump turbine and the booster pump are connected, after an opening of the first inlet valve reaches a predetermined value, and then closing the first inlet valve completely.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
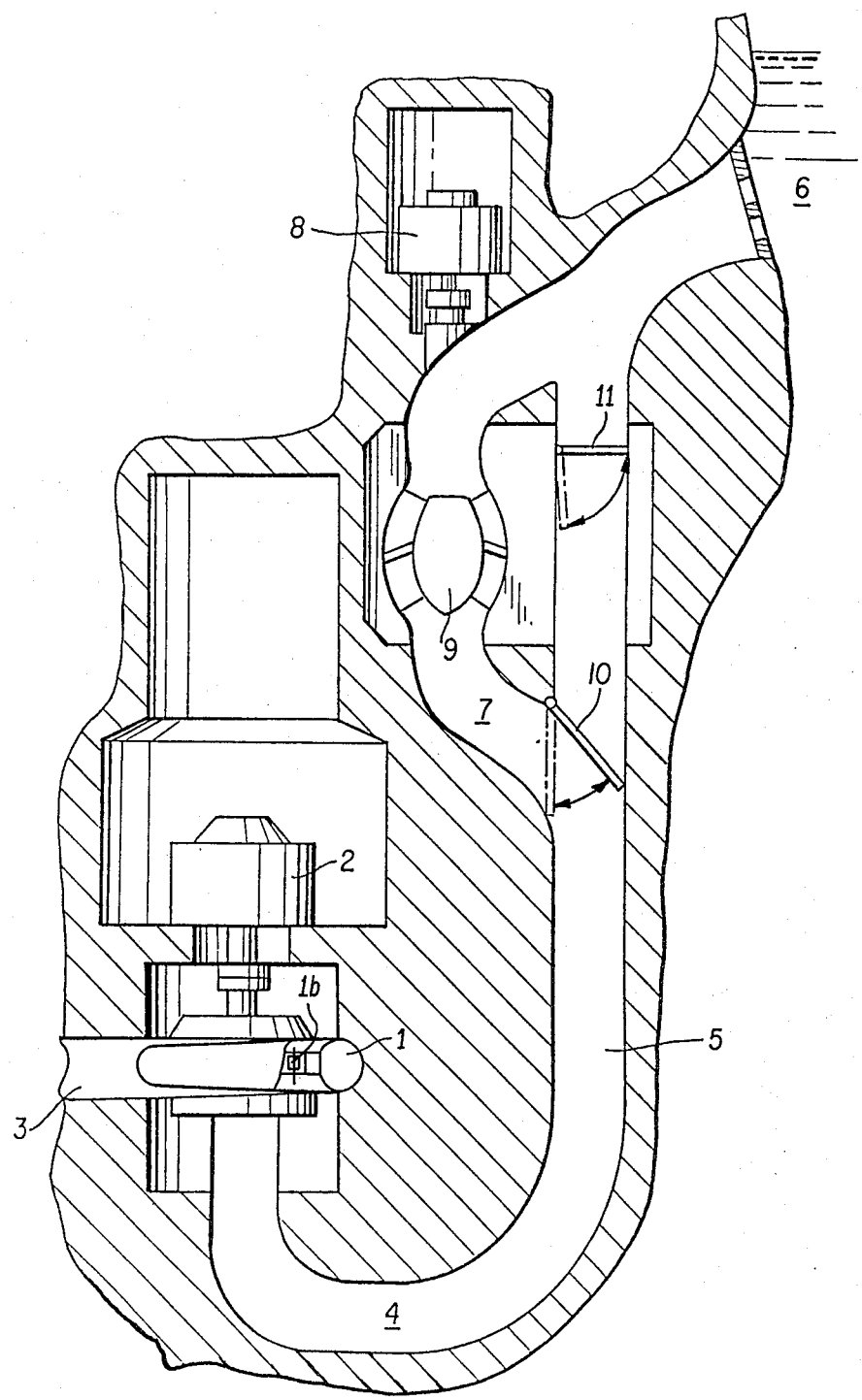
FIG. 1 is a schematic drawing of a pumping-up power plant which is used for applying this invention.

Referring now to the drawings, wherein like reference numerals designate identical or corresponding parts throughout the several views, and more particularly to FIG. 1 thereof, there are shown a single-speed reversible pump turbine 1 and a motor-generator 2 directly coupled to the pump turbine 1. Also, there are shown a pipe line 3 connecting the pump turbine 1 with an upper reservoir (not shown), a lower reservoir 6, a draft tunnel 5 connecting a draft tube 4 of the pump turbine 1 with the lower reservoir 6, a branch pipe 7 provided in parallel with a portion of the draft tunnel 5 to bypass the draft tunnel 5, and a booster pump 9 in the middle of the branch pipe 7. Numeral 10 designates an inlet valve disposed at the discharge side of the booster pump 9 in the branch pipe 7 and numeral 11 designates an inlet valve disposed in a portion of the draft tunnel 5 where the branch pipe 7 runs in parallel with the draft tunnel 5. Numeral 8 denotes a driving unit for driving the booster pump 9. To simplify the drawing, the connection between the booster pump 9 and the driving unit 8 is omitted, and the booster pump 9 is drawn only symbolically. There are also provided guide vanes 1b in the pump turbine 1 which act as an inlet valve at the discharge side thereof as is conventional.

Now there will be described the operation of the pumping-up power plant with the above mentioned construction. Hereinafter the states of the inlet valve 10 and the inlet valve 11 are defined as follows: the solid line position of the inlet valve 10 shows its open state and the broken line, its closed state; the solid line position of the inlet valve 11 shows its closed state and the broken line, its open state in FIG. 1. First, in turbine operation of the pump turbine 1, the inlet valve 10 is moved to its broken line position to close branch pipe 7 and the inlet valve 11 is moved to its broken line position to open the draft tunnel 5, thereby directly connecting the draft tunnel 5 with the lower reservoir 6, and the pump turbine 1 is run as a water turbine. FIG. 1 shows this position in broken lines. In this case water current introduced from an upper reservoir (not shown) is supplied to drive the pump turbine 1 via the pipe line 3, and then flows out into the draft tube 4. The pump turbine 1 performs a turbine operation, driving the motor-generator 2 to generate electric power. The current delivered to the draft tube 4 flows out into the lower reservoir 6 via the draft tunnel 5. At this time the booster pump 9 is not in operation.

In operating the pump turbine 1 as a pump, on the other hand, the inlet valve 10 is moved to its solid line position to open the branch pipe 7 and the inlet valve 11 is moved to its solid line position to close the portion of the draft tunnel 5 running in parallel with the branch pipe 7. Accordingly, the draft tube 4 is connected to the lower reservoir 6 via the branch pipe 7 opening in the middle of the draft tunnel 5 and a portion of the draft tunnel 5 on the lower reservoir 6 side. FIG. 1 shows this position in solid lines. In this case, the pump turbine 1 is driven by the motor generator 2, while the booster pump 9 is driven by the driving unit 8. Since the pump-turbine 1 and the booster pump 7 are hydraulically connected in series with each other, water sucked from the lower reservoir 6 into the lower reservoir side portion of the draft tunnel 5 by the booster pump 9 flows into the pump turbine 1 through the branch pipe 7, the portion of the draft tunnel 5 on the pump turbine 1 side, and the draft tube 4, and is pressurized and forced up to the upper reservoir by means of the pipe line 3.

Hereinafter a method for stopping the pump turbine 1 as a pump and the booster pump 9, operating in series with each other, according to this invention, will be described in detail.

Figure 2:
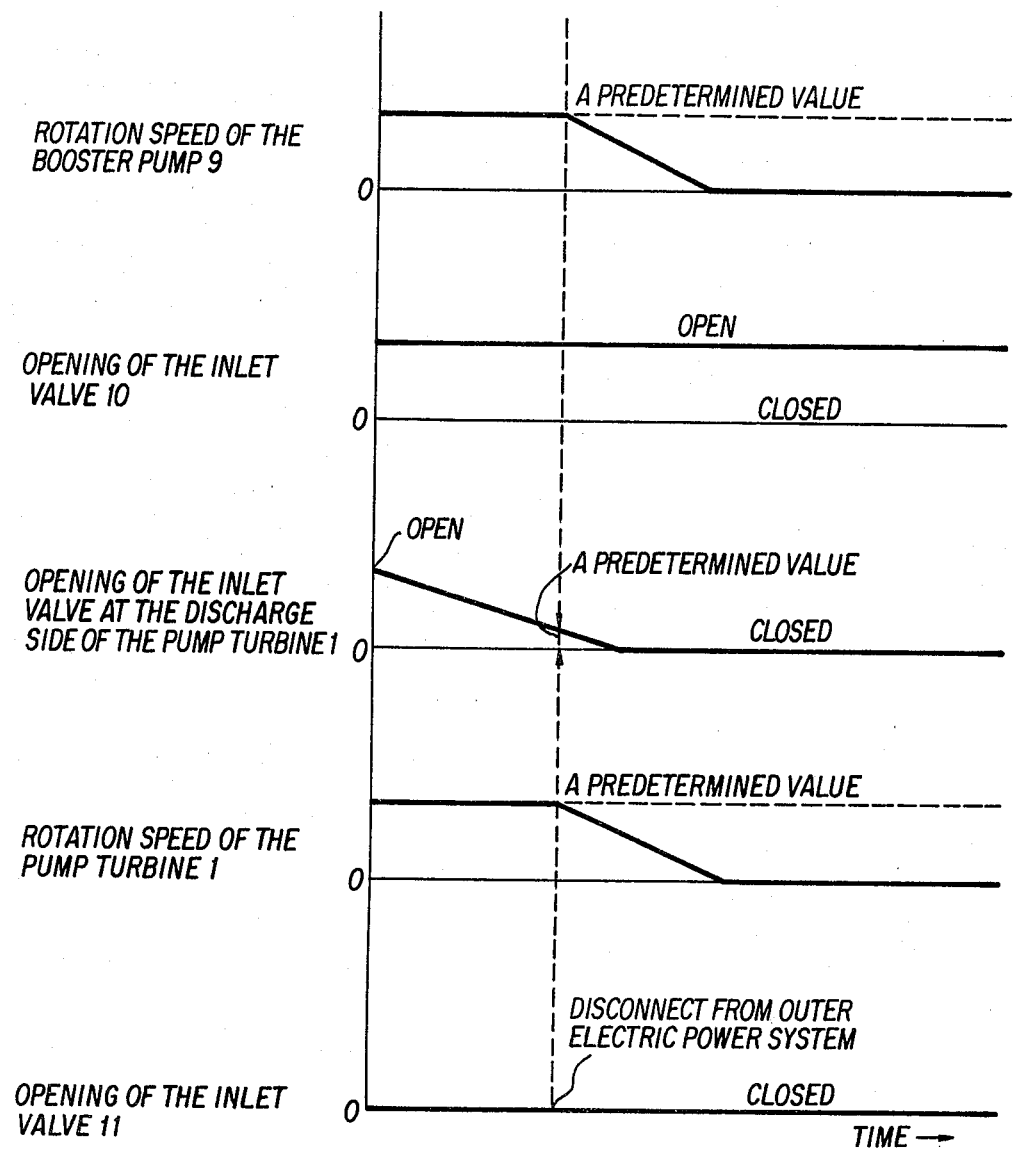
FIGS. 2 and 3 are diagrams illustrating the time sequence of preferred embodiments of this invention.
Figure 3:
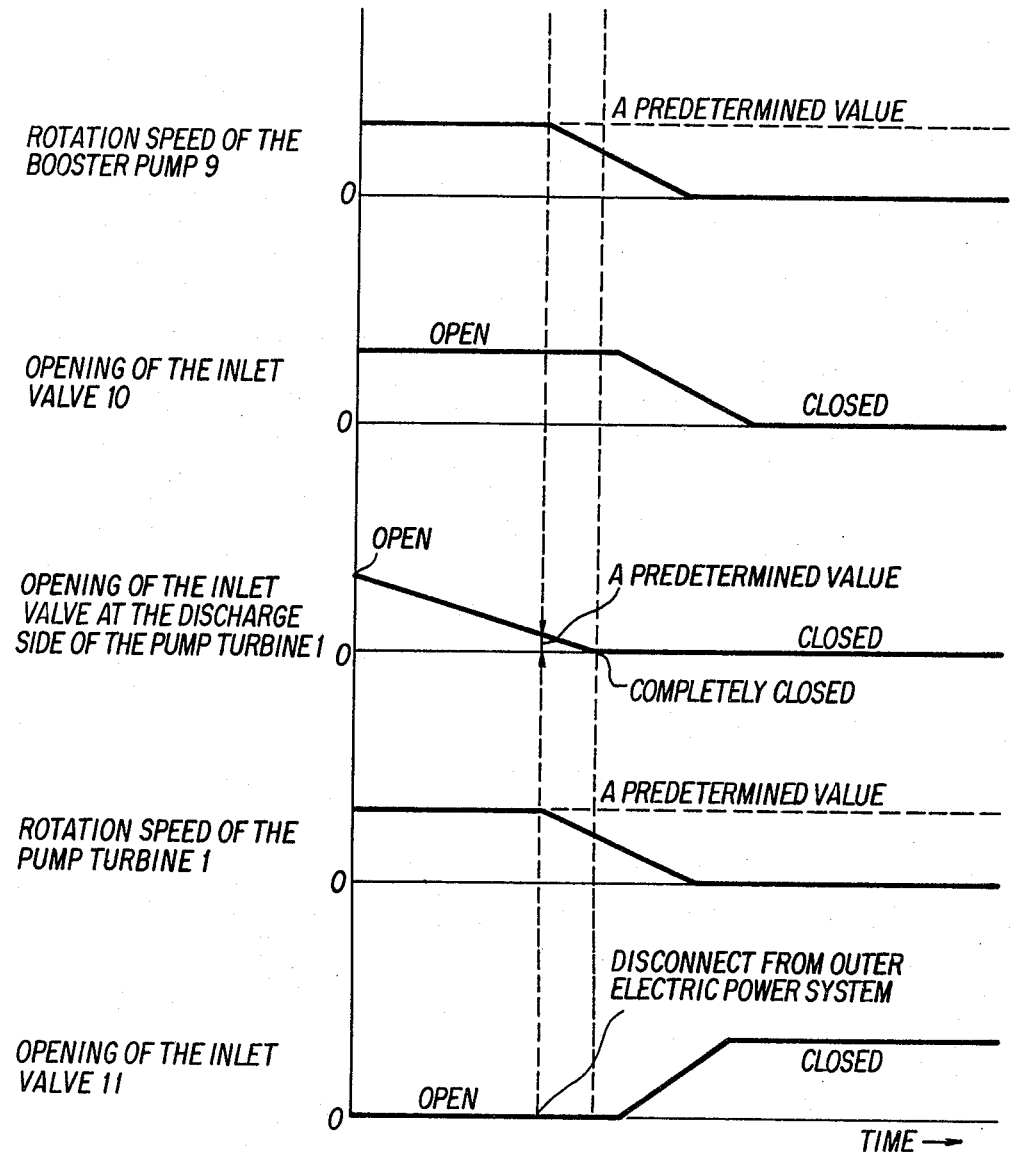

In pump operation, the inlet valve 10 is in its solid line position and the inlet valve 11 is in its solid line position (FIG. 1), as is described above. First the closing of the guide vanes 1b at the discharge side of the pump turbine 1 is initiated. When the opening of the inlet valve reaches a predetermined small value, both the pump turbine 1 and the booster pump 9 are simultaneously disconnected from the outer electric power system by breaking the input power thereof. Then the rotational speeds of the pump turbine 1 and the booster pump 9 gradually reach a small value. The inlet valve at the discharge side of the pump turbine 1 is then completely closed and both the pump turbine 1 and the booster pump 9 come to a stop. FIG. 2 shows the time sequence of the operation described above.

This invention is not restricted to this embodiment. For example, there may be a case where after stopping the pump operation of the pump turbine 1 and the booster pump 9 it is necessary to immediately operate the pump turbine 1 as a turbine. In this case, the pump turbine 1 and the booster pump 9 are disconnected from the outer electric power system so that the rotational speeds thereof begin to be reduced. After that, when the inlet valve at the discharge side of the pump turbine 1 is completely closed, the inlet valve 10 is closed and the inlet valve 11 is opened to prepare for the following turbine operation. According to this invention, the closing control necessary for stopping the pump turbine 1 as a pump and the booster pump 9, operating in series with each other, is performed by controlling only the inlet valve defined by guide vane 1b at the discharge side of the pump turbine 1, which causes the control to be very simple. Therefore this invention can prevent problems arising from a complicated control sequence.

Moreover as both the pump turbine 1 and the booster pump 9 are disconnected simultaneously from the outer electric power system, the rotational speeds of both fall at an almost equal rate and the operation conditions of both change similarly to each other because the changing of the water flow rate is common to both the pump turbine 1 and the booster pump 9. This prevents the problem of, for example, abnormal changes of water pressure caused by the interference between the pump turbine 1 and the booster pump 9, resulting from the extreme differences in operation conditions therebetween which may result when one of them is disconnected earlier than the other. Therefore the pump turbine 1 as a pump and the booster pump 9 can be controlled so as to be stopped safely.

Also, when the flow rate in the inlet valve at the discharge side of the pump turbine 1 becomes small and the inlet valve is open only to the predetermined small value, the pump turbine 1 and the booster pump 9 are disconnected from the outer electric power system by breaking the input power thereof, which may be small. Therefore this invention limits the disturbance applied to the outer electric power system to a minimum value.

Moreover, in the case where the pump turbine 1 must be operated as a turbine immediately after the pump turbine 1 as the pump and the booster 9 are stopped, the pump turbine 1 and the booster pump 9 are first disconnected from the outer electric power system. Then when the inlet valve at the discharge side of the pump turbine 1 is completely closed, namely when there is no water flow in either the draft tunnel 5 or the branch pipe 7, both the inlet valve 10 and the inlet valve 11 are operated to be closed or opened at the condition where there is no water flow. Therefore both the inlet valve 10 and the inlet valve 11 can be operated to be closed or opened safely and smoothly under conditions where the water pressure applied to them is small.

Moreover in the pumping-up power plant shown in FIG. 1, both terminals of the branch pipe 7 are connected to the draft tunnel 5. This invention can also be applied to a pumping-up power plane where one terminal of the branch pipe 7 is connected directly to the lower reservoir 6.

As described above, this invention can provide a method for operating pumps in a pumping-up power plant having a single speed reversible pump turbine and a booster pump in which the pump turbine as a pump and the booster pump operating in series with each other can be stopped, simply, smoothly and promptly without a complicated control technique.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A method for operating pumps in a pumping-up power plant having a single speed reversible pump turbine and a booster pump, said booster pump being provided in a branch pipe which is in parallel with a portion of a draft tunnel between said pump turbine and a lower reservoir; comprising the steps of:
   initiating the closing of a first inlet valve at the discharge side of said pump turbine;
   disconnecting said pump turbine and said booster pump simultaneously from an outer electric power system to which said pump turbine and said booster pump are connected, after a degree of opening of said first inlet valve is reduced to a predetermined value; and
   closing said first inlet valve completely.

2. A method for operating pumps according to claim 1, wherein:
   said first inlet valve is initially open;

said branch pipe is initially open;
said portion of said draft tunnel which runs in parallel with said branch pipe is initially closed;
said pump turbine as a pump and said booster pump are operating in series with each other; and
said step of initiating the closing of said first inlet valve is then performed.

3. A method for operating pumps according to claim 2, comprising after said first inlet valve is closed completely, the steps of:
closing said branch pipe; and
opening said portion of said draft tunnel.

4. A method for operating pumps according to claim 2, wherein:
said branch pipe is opened and said portion of said draft tunnel is closed by opening a second inlet valve disposed at the discharge side of said booster pump in said branch pipe and closing a third inlet valve disposed in said portion of said draft tunnel.

5. A method for operating pumps according to claim 3, wherein:
said branch pipe is opened and said portion of said draft tunnel is closed by opening a second inlet valve disposed at the discharge side of said booster pump in said branch pipe and closing a third inlet valve disposed in said portion of said draft tunnel; and wherein the step of closing said branch pipe and the step of opening said portion of said draft tunnel are performed by closing said second inlet valve and opening said third inlet valve.

* * * * *